(12) United States Patent
Tan et al.

(10) Patent No.: US 12,204,054 B2
(45) Date of Patent: Jan. 21, 2025

(54) LIDAR TEST SYSTEMS

(71) Applicant: Keysight Technologies, Inc., Santa Rosa, CA (US)

(72) Inventors: Chan Fong Tan, Pulau Pinang (MY); Christopher Coleman, Santa Clara, CA (US); Paul L. Corredoura, Redwood City, CA (US); Bogdan Szafraniec, Sunnyvale, CA (US); Mong Long Ang, Pulau Pinang (MY)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 1069 days.

(21) Appl. No.: 17/126,085

(22) Filed: Dec. 18, 2020

(65) Prior Publication Data
US 2021/0373137 A1     Dec. 2, 2021

Related U.S. Application Data

(60) Provisional application No. 63/030,672, filed on May 27, 2020.

(51) Int. Cl.
*G01S 7/497* (2006.01)
*G02B 5/10* (2006.01)
(Continued)

(52) U.S. Cl.
CPC ............. *G01S 7/497* (2013.01); *G02B 5/10* (2013.01); *G02B 26/023* (2013.01); *G01S 17/10* (2013.01); *G01S 17/931* (2020.01)

(58) Field of Classification Search
CPC ........ G01S 7/497; G01S 17/10; G01S 17/931; G01S 17/42; G02B 5/10; G02B 26/023;
(Continued)

(56) References Cited

U.S. PATENT DOCUMENTS

| 4,021,662 A | 5/1977 | Mimms |
| 4,521,780 A | 6/1985 | Preikschat |
| 5,856,805 A | 1/1999 | Page |
| 8,452,187 B2 | 5/2013 | Mazzochette et al. |

(Continued)

FOREIGN PATENT DOCUMENTS

| CN | 108519590 A | 9/2018 |
| CN | 110196420 A | 9/2019 |

(Continued)

OTHER PUBLICATIONS

English translation of RU2683604C1, 4 pgs.
(Continued)

*Primary Examiner* — Daniel L Murphy

(57) ABSTRACT

Systems and components for testing a light detection and ranging (LIDAR) device under test (DUT) are described. In one example, an ellipsoid is adapted to receive the LIDAR DUT at a first focal point, where light transmitted from the LIDAR DUT is incident on the second focal point. In another example a plurality of optical waveguides arranged in at least a portion of a circle, and the plurality of optical waveguides are adapted to receive light from the LIDAR DUT. In another example, a LIDAR distance simulator is adapted to receive an optical input, and includes optical switches that are selectively connected to one of a plurality of optical delay devices to an input of the one of a plurality of optical input channels. Illustrative delay elements may be realized through optical delay elements or a combination of optical and electrical delay elements.

19 Claims, 10 Drawing Sheets

(51) Int. Cl.
  *G02B 26/02* (2006.01)
  *G01S 17/10* (2020.01)
  *G01S 17/931* (2020.01)

(58) Field of Classification Search
  CPC ... G02B 26/0816; G02B 27/62; G02B 7/1821
  USPC ........................................................ 356/4.01
  See application file for complete search history.

(56) References Cited

U.S. PATENT DOCUMENTS

| | | | |
|---|---|---|---|
| 9,110,154 B1 | 8/2015 | Bates et al. | |
| 11,300,779 B2* | 4/2022 | Dussan | G02B 27/141 |
| 2018/0356503 A1 | 12/2018 | Konrad | |
| 2019/0162829 A1 | 5/2019 | Konrad | |

FOREIGN PATENT DOCUMENTS

| | | |
|---|---|---|
| DE | 102014118625 A1 | 6/2016 |
| EP | 1705497 B1 | 6/2019 |
| GB | 908030 A | 10/1962 |
| KR | 20150134469 A | 12/2015 |
| RU | 2683604 C1 | 3/2019 |
| WO | 1993006502 A | 4/1993 |

OTHER PUBLICATIONS

English translation of DE102014118625A1, 9 pgs.
English translation of CN110196420A, 16 pgs.
English translation of KR2015134469A, 7 pgs.
English translation of CN108519590A, 15 pgs.

* cited by examiner

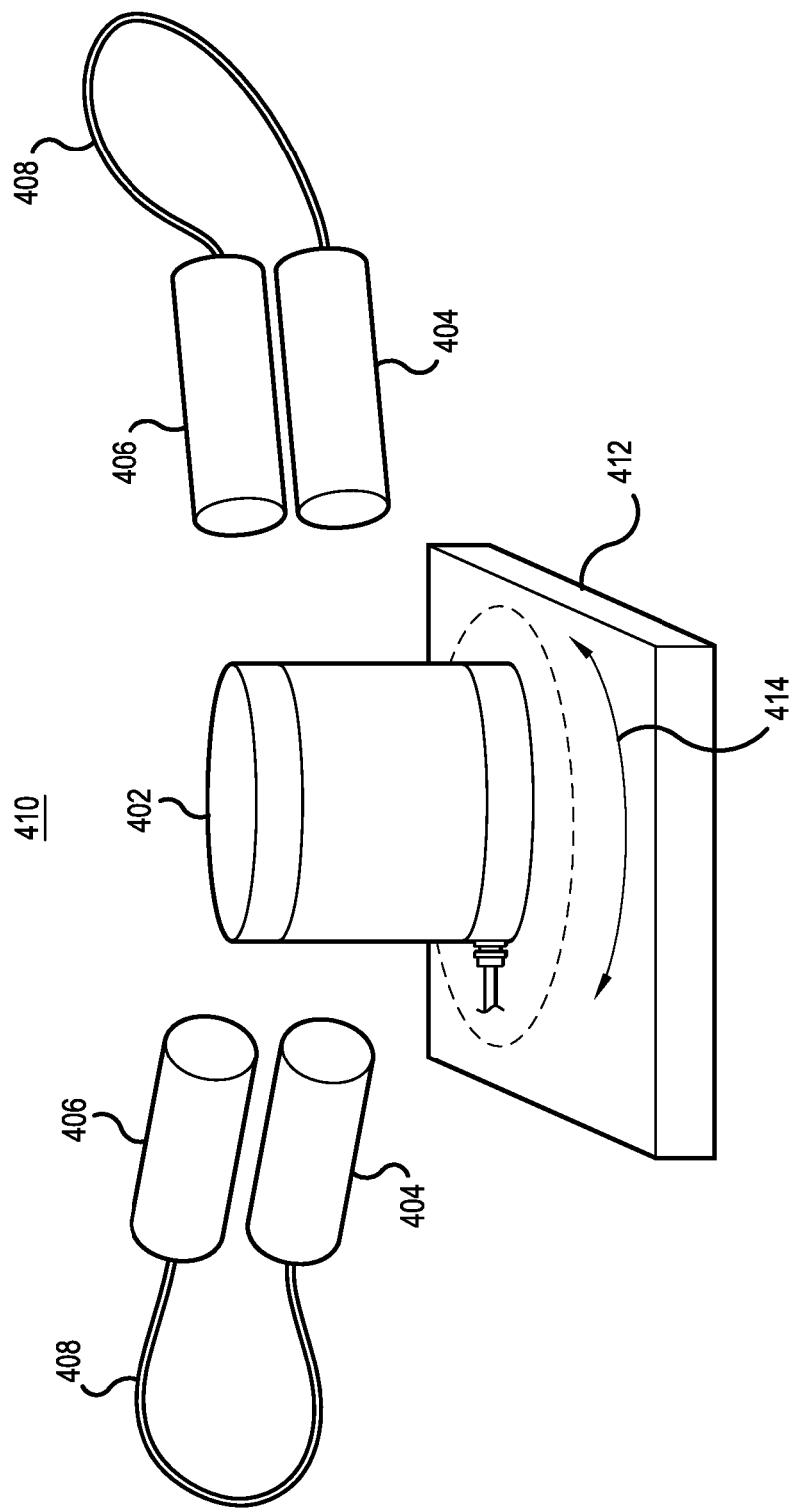

LIDAR TEST SYSTEMS

CROSS REFERENCE TO RELATED APPLICATIONS

The present application claims priority under 35 U.S.C. § 119(e) and under 37 C.F.R. § 1.78(a) to commonly owned U.S. Provisional Application No. 63/030,672 filed on May 27, 2020. The entire disclosure of U.S. Provisional Application No. 63/030,672 is specifically incorporated herein by reference.

BACKGROUND

Devices for light detection and ranging (lidar) are useful in various safety aspects of vehicles. For example, lidars can be used much like automotive radar for maintaining safe distances between moving vehicles and cruise control. The lidar devices beneficially detect objects at distances to ensure safe travel in the vehicle.

One type of lidar is known as a time-of-flight (TOF) lidar. TOF lidars comprises a plurality of transmitters and receivers adapted to transmit and receive laser light to/from the surroundings to exact certain measurements, such as distance of different objects from the lidar. The time delay of the round-trip pulse received at the lidar receiver is used to determine the distance from the object, which is often referred to as a target. Reliable measurements require the transmit laser to emit light pulses sequentially over an azimuth and elevation angle, and be paired with a specific receiver.

Known testing of lidars installed in vehicles poses certain problems and attendant costs. For example, lidars function desirably over a fairly large distance (e.g., 300 m), azimuth angle (up to 360°), and elevation angle (e.g., 30°). As can be appreciated, testing lidars during vehicle assembly would require a special facility to effect the distance, azimuth angle (up to 360°) and elevation angle (e.g., 30°).

Accordingly, an emulator to test accurately the lidars during assembly in the factory is desirable.

BRIEF DESCRIPTION OF THE DRAWINGS

The representative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 4B is a perspective view of a lidar test system in accordance with another representative embodiment.

DETAILED DESCRIPTION

Figure 1:
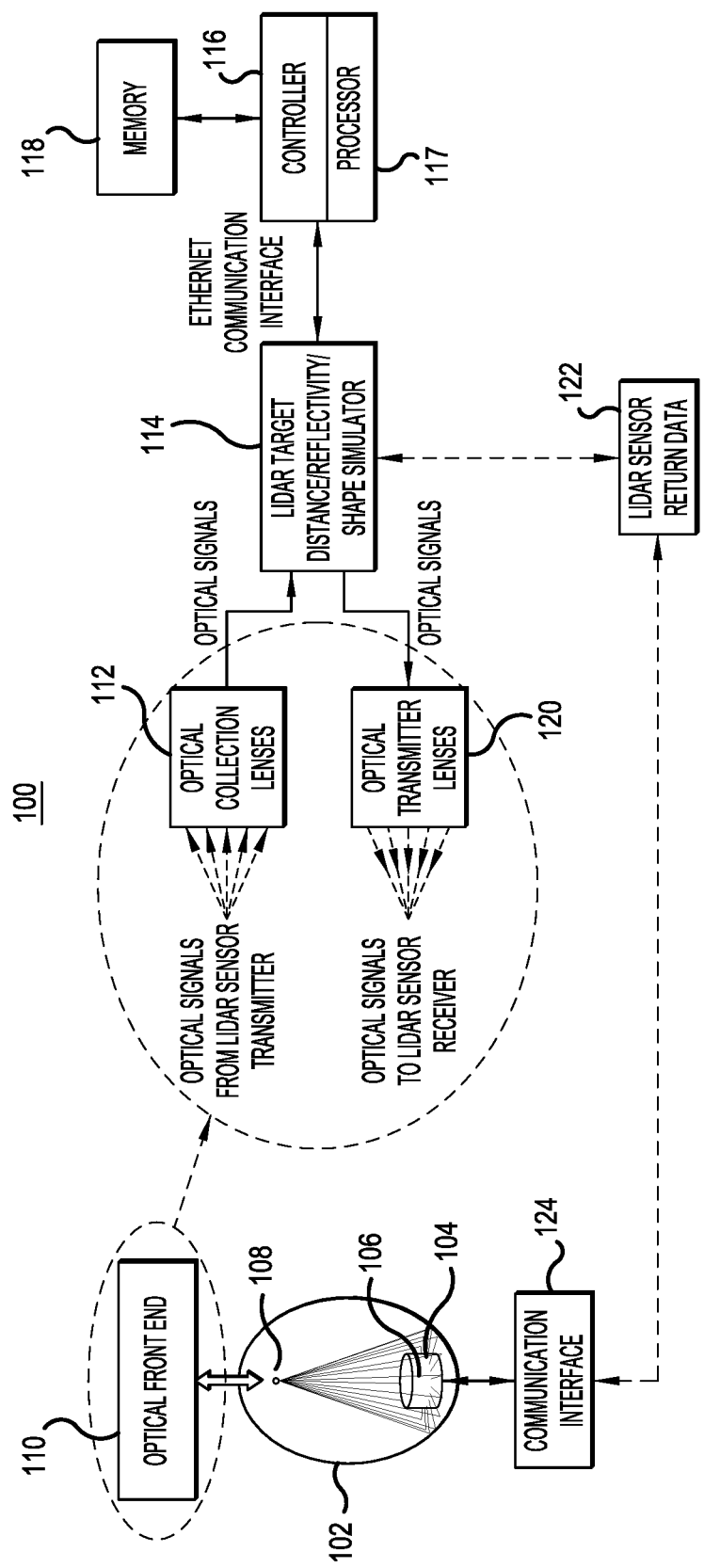
FIG. 1 is a simplified schematic diagram of a lidar test system in accordance with a representative embodiment.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

Unless otherwise noted, when a first element (e.g., an optical waveguide) is said to be connected to a second element (e.g., another optical waveguide), this encompasses cases where one or more intermediate elements or intervening devices may be employed to connect the two elements to each other. However, when a first element is said to be directly connected to a second element, this encompasses only cases where the two elements are connected to each other without any intermediate or intervening devices. Similarly, when a signal is said to be coupled to an element, this encompasses cases where one or more intermediate elements may be employed to couple the signal to the element. However, when a signal is said to be directly coupled to an element, this encompasses only cases where the signal is directly coupled to the element without any intermediate or intervening devices.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," may be used to describe the various elements' relationships to one another, as illustrated in the accompanying drawings. These relative terms are intended to encompass different orientations of the elements thereof in addition to the orientation depicted in the drawings. For example, if an apparatus depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

Various embodiments of systems for testing lidar devices are described herein.

In accordance with a representative embodiment, a system for testing a light detection and ranging (LIDAR) device under test (DUT) is disclosed. The system comprises: an ellipsoid (elliptical reflector) having a first focal point and a second focal point. The ellipsoid is adapted to receive the LIDAR DUT substantially at the first focal point, and light transmitted from the LIDAR DUT is substantially incident on the second focal point. The system also comprises an optical waveguide or optical elements coupled to the second focal point, and adapted to transmit light from the second focal point to a link comprising a delay device that provides a delay to emulate a desired distance.

In accordance with another representative embodiment, an apparatus for testing a light detection and ranging (lidar) device is disclosed. The apparatus comprises an ellipsoid (elliptical reflector) comprising a substantially hollow interior having a first focal point and a second focal point. The ellipsoid is adapted to receive the LIDAR DUT at the first focal point, wherein light transmitted from the LIDAR DUT is incident on the second focal point.

In accordance with yet another representative embodiment, a system for testing a light detection and ranging (LIDAR) device under test (DUT) is disclosed. The system comprises: an ellipsoid (elliptical reflector) having a first focal point and a second focal point. The ellipsoid is adapted to receive the LIDAR DUT at the first focal point, and light transmitted from the LIDAR DUT is incident on the second focal point. The system also comprises an optical input disposed adjacent to and in optical communication with the second focal point and adapted to receive an input signal; and a delay device coupled to the optical input and comprising an electrical delay element. The delay device is adapted to emulate a desired distance. The system also comprises an optical output disposed adjacent to and in optical communication with the second focal point. The optical output is adapted to receive an output signal from the delay device, and transmit the output signal to the second focal point.

In accordance with another representative embodiment, a system for testing a light detection and ranging (LIDAR) device under test (DUT) is disclosed. The system comprises: a plurality of optical waveguides arranged in at least a portion of a circle. The plurality of optical waveguides are adapted to receive light from the LIDAR DUT. The system also comprises a delay device that provides a delay to emulate a desired distance. The delay device receives the light from one of the plurality of optical waveguides, and returns the light to the LIDAR DUT through another of the plurality of optical waveguides.

In accordance with another representative embodiment, an apparatus for testing a light detection and ranging (LIDAR) device is disclosed. The apparatus comprises a transmit optical waveguide and a receive optical waveguide being adapted to transmit light to and receive light from the LIDAR DUT, respectively; and a rotary stage having a surface adapted to receive the LIDAR DUT. The rotary stage is adapted to rotate and stop at a first position during a first measurement, and to rotate and stop at a second position during a second measurement.

In accordance with yet another representative embodiment, a system for testing a light detection and ranging (LIDAR) device under test (DUT) is disclosed. The system comprises a LIDAR distance simulator adapted to receive an optical input. The LIDAR distance simulator comprises a plurality of optical delay devices connected in series. Each of the plurality of optical delay devices provides a predetermined optical delay indicative of an emulated distance.

In accordance with yet another representative embodiment, a system for testing a light detection and ranging (LIDAR) device under test (DUT) is disclosed. The system comprises: a LIDAR distance simulator adapted to receive an optical input. The LIDAR distance simulator comprises: a first optical switch adapted to connect to an output of one of a plurality of optical input channels; a second optical switch adapted to connect the one of the plurality of optical input channels to one of a plurality of optical delay devices; a third optical switch adapted to connect to an output of the one of the plurality of optical delay devices; and a fourth optical switch adapted to connect the output of the one of the plurality of optical delay devices to an input of the one of a plurality of optical input channels.

In accordance with yet another representative embodiment, a system for testing a light detection and ranging (LIDAR) device under test (DUT) is disclosed. The system comprises: a LIDAR distance simulator adapted to receive an optical input. The LIDAR distance simulator comprises: an optical delay element comprising a plurality of optical delay devices connected in series. Each of the plurality of optical delay devices provides a predetermined optical delay indicative of an optical path length. The system further comprises a photodetector adapted to receive light from the optical delay element, and convert the light to an electrical input; an electrical delay circuit coupled to the photodetector and adapted to receive the electrical input and to simulate distance; and an optical emitter coupled to the electrical delay circuit, and adapted to provide an optical output indicative of a simulated distance, wherein the simulated distance is a sum of delay of the optical delay element and the electrical delay circuit.

FIG. 1 is a simplified schematic diagram of a lidar test system 100 in accordance with a representative embodiment.

The lidar test system 100 comprises an ellipsoid 102 having a lidar device under test (DUT) 104 having a first focal point 106 and a second focal point 108. The lidar DUT 104 is disposed so that its transmitter (not shown in FIG. 1) and receiver (not shown in FIG. 1) is disposed at the first focal point 106 of the ellipsoid. As described more fully herein, light transmitted from the lidar DUT 104 is incident on a second focal point 108 and delivered to the lidar simulator 114, and light transmitted by the lidar simulator 114 and incident on the second focal point 108 is reflected to the first focal point 106.

The lidar test system 100 further comprises optical front end 110 that contains the optical collection lens 112 and the optical transmitter lens 120. The optical collection lens 112 is adapted to receive light incident from the lidar DUT 104 at the second focal point 108 and to transmit the light (e.g., by optical fibers) to the lidar simulator 114. In one embodiment, the optical input of the lidar simulator 114 is placed directly on the second focal point 108. As its name suggests, and as described more fully below, the lidar simulator 114 is adapted to simulate the distance, or the reflectivity, or the shape, or a combination thereof of a target (not shown in FIG. 1). As described more fully below, the simulator may comprise an optical simulator, or a combination of an optical and an electrical (i.e., a hybrid) simulator.

The lidar test system 100 also comprises a controller 116 that is coupled to a memory 118. The controller 116 comprises a processor 117 and is adapted to support a test sequence of measurements (e.g., distance, reflectivity and shape) of a target being simulated for light signals from the lidar DUT 104 covering a space of azimuth angles and elevation angles (i.e., layers). The processor 117, which is tangible and non-transitory, is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 117 (and other processors) of the present teachings is an article of manufacture and/or a machine component. The processor 117 for the controller 116 is configured to execute software instructions stored in the memory 118 to perform functions as described in the various embodiments herein. The processor 117 may be a general-purpose processor or may be part of an application specific integrated circuit (ASIC). The processor 117 may also be (or include) a microprocessor, a microcomputer, a processor chip, a controller, a microcontroller, a digital signal processor (DSP), a state machine, or a programmable logic device. The processor 117 may also be (or include) a logical circuit, including a programmable gate array (PGA) such as a field programmable gate array (FPGA), or another type of circuit that includes discrete gate and/or transistor logic. The processor 117 may be a central processing unit (CPU), a graphics processing unit (GPU), or both. Additionally, the processor 117 may comprise multiple processors, parallel processors, or both. Multiple processors may be included in, or coupled to, a single device or multiple devices.

The memory 118 may comprise a main memory or a static memory, or both, where the memories may communicate with each other via a bus (not shown). The memory 118 described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 118 of the present teachings is an article of manufacture and/or machine component. The memory 118 (and other memories described herein) are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-Ray™ disk, or any other form of storage medium known to one of ordinary skill in the art. Memories of the present teachings may be volatile or non-volatile, secure and/or encrypted, unsecure and/or unencrypted.

Upon completion of the simulation by the simulator, optical signals are provided to optical transmitter lenses 120 (e.g., by optical fibers) to be focused at the second focal point 108 of the ellipsoid 102. The optical transmitter lenses 120 are contained in the optical front end 110. In one embodiment, the optical output of the lidar simulator 114 is placed directly in the second focal point 108. As described more fully herein, the light incident on the second focal point 108 is reflected to the first focal point 106, where it is received by the lidar receiver (not shown in FIG. 1). As will be appreciated, the light received by the lidar receiver includes information of the simulated distance, or reflectivity, or shape, or a combination thereof for further analysis by the lidar DUT 104.

Lidar sensor return data gathered by the lidar DUT 104 are compared against the simulator scenario. Data from the lidar DUT 104 are delivered to the lidar sensor return data module 122 by means of the communication interface 124 for use in further testing of the lidar DUT 104. The simulation scenario is delivered to the lidar sensor return data module 122 directly from the lidar simulator 114. In a representative embodiment, lidar sensor return data module 122 receives the data packets returned from lidar DUT 104, and contains a simulated scenario in the form of data points measurement information such as shape of the target, distance of the target, target reflected intensity, measurement timestamp, horizontal and vertical angle of each measurement point/pixel, XYZ coordinates of each measurement point/pixel, Laser ID of each measurement. Measurement data packets are sent from the lidar DUT 104 to the lidar simulator 114 via an ethernet or USB communication interface, for example.

As will be described in further detail below, the lidar test system 100 beneficially allows testing of lidar DUT 104 in a controlled and comparatively confined arrangement, such as at a production line of a lidar device.

Figure 2:
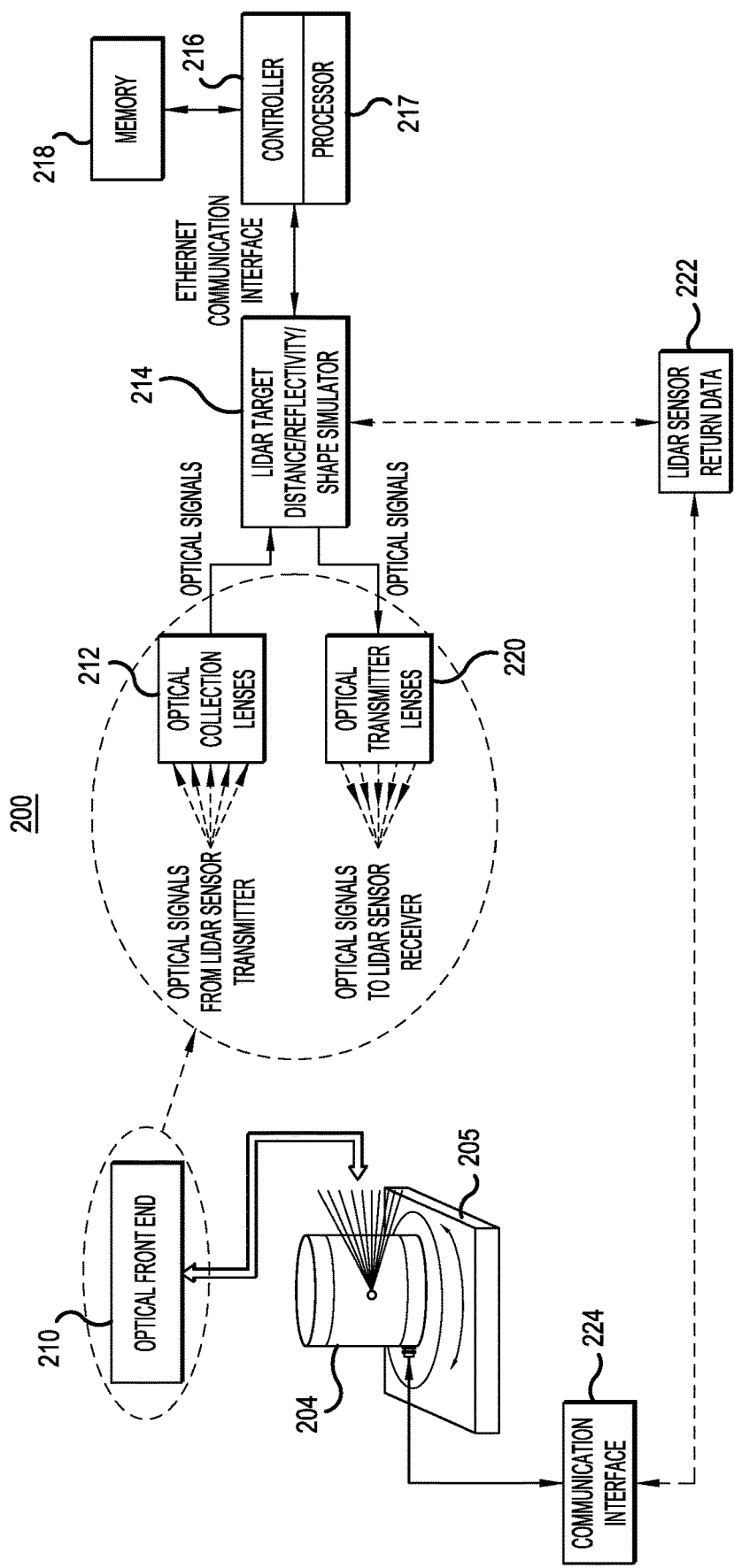
FIG. 2 is a simplified schematic diagram of a lidar test system in accordance with a representative embodiment.

FIG. 2 is a simplified schematic diagram of a lidar test system 200 in accordance with a representative embodiment.

The lidar test system 200 comprises a lidar device under test (DUT) 204 disposed over a rotary stage 205. The lidar test system 200 further comprises an optical front end 210. An optical front end 210 contains the optical collection lens 212 and the optical transmitter lens 220. The optical collection lens 212 is adapted to receive light incident from the lidar DUT 204 and to transmit the light (e.g., by optical fibers) to the simulator 214. As its name suggests, and as described more fully below, the simulator 214 is adapted to simulate the distance, or the reflectivity, or the shape, or a combination thereof of a target (not shown in FIG. 1). As described more fully below, the simulator may comprise an optical simulator, or a combination of optical and electrical (i.e., a hybrid) simulator.

The lidar test system 200 also comprises a controller 216 that is coupled to a memory 218. The controller 216 comprises a processor 217 and is adapted to support a test sequence of light signals (e.g., channels) from the lidar DUT 204, measurements (e.g., distance, reflectivity and shape) of a target being simulated. The processor 217, which is tangible and non-transitory, is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 217 (and other processors) of the present teachings is an article of manufacture and/or a machine component. The processor 217 for the controller 216 is configured to execute software instructions stored in the memory 218 to perform functions as described in the various embodiments herein. The processor 217 may be a general-purpose processor or may be part of an application specific integrated circuit (ASIC). The processor 217 may also be (or include) a microprocessor, a microcomputer, a processor chip, a controller, a microcontroller, a digital signal processor (DSP), a state machine, or a programmable logic device. The processor 217 may also be (or include) a logical circuit, including a programmable gate array (PGA) such as a field programmable gate array (FPGA), or another type of circuit that includes discrete gate and/or transistor logic. The processor 217 may be a central processing unit (CPU), a graphics processing unit (GPU), or both. Additionally, the processor 217 may comprise multiple processors, parallel processors, or both. Multiple processors may be included in, or coupled to, a single device or multiple devices.

The memory 218 may comprise a main memory or a static memory, or both, where the memories may communicate with each other via a bus (not shown). The memory 218 described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 218 of the present teachings is an article of manufacture and/or machine component. The memory 218 (and other memories described herein) are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known to one of ordinary skill in the art. Memories of the present teachings may be volatile or non-volatile, secure and/or encrypted, unsecure and/or unencrypted.

Upon completion of the simulation by the simulator, optical signals are provided to optical transmitter lenses 220 (e.g., by optical fibers), which are contained in the optical front end 210, and to the lidar DUT 204. As will be appreciated the light received by the lidar receiver includes information of the simulated distance, or reflectivity, or shape, or a combination thereof for further analysis by the lidar DUT 204.

Lidar sensor return data gathered by the lidar DUT 204, are compared against the simulator scenario. Data from the lidar DUT 204 are delivered to the lidar sensor return data module 222 by means of the communication interface 224 for use in further testing of the lidar DUT 204. The simulation scenario is also delivered to the lidar sensor return data module 222 directly from the simulator 214. Notably, the lidar sensor return data module 222 includes a processor and a memory. The memory stores instructions, which when executed by the processor compares received data to actual scenarios. In a representative embodiment, lidar sensor return data module 222 receives the data packets returned from lidar DUT 204, and contains a simulated scenario in the form of data points measurement information such as shape of the target, distance of the target, target reflected intensity, measurement timestamp, horizontal and vertical angle of each measurement point/pixel, XYZ coordinates of each measurement point/pixel, Laser ID of each measurement. Measurement data packets are sent from lidar DUT 204 to simulator 214 via an ethernet or USB communication interface, for example.

As will be described in further detail below, the lidar test system 200 beneficially allows testing of lidar DUT 204 in a controlled and comparatively confined arrangement, such as at a production line of a lidar device.

Figure 3B:
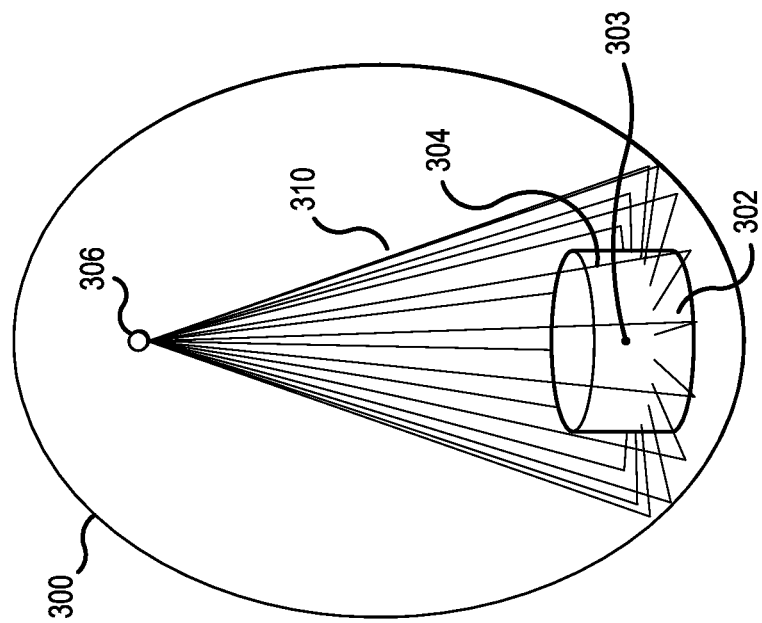
FIGS. 3A and 3B are perspective views of an ellipsoid configured to surround a lidar device under test (DUT) in accordance with representative embodiments.
Figure 3A:
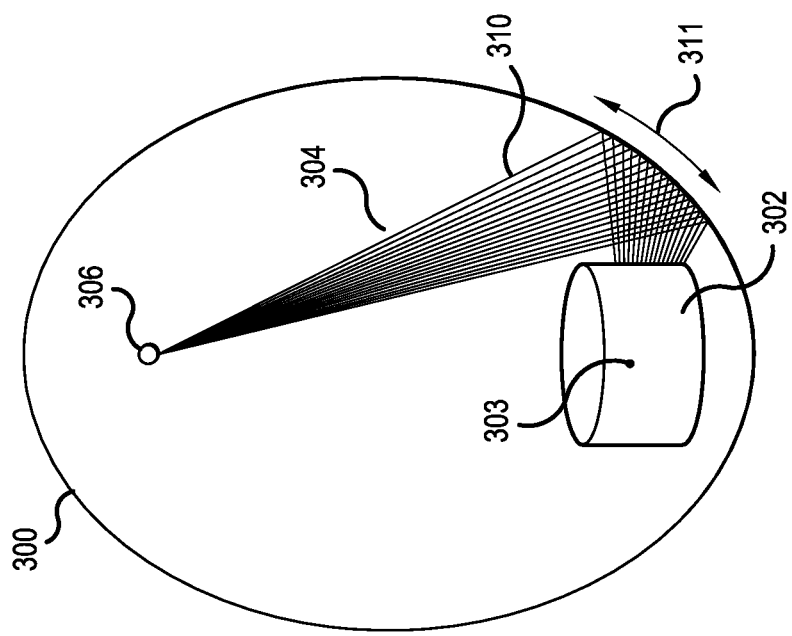

FIGS. 3A and 3B are perspective views of an ellipsoid 300 (elliptical reflector) configured to surround a lidar device under test (DUT) 302 in accordance with representative embodiments.

As alluded to above, the lidar DUT 304 is disposed in and is thus surrounded by the ellipsoid 300. Notably, the transmitter and receiver (not shown in FIGS. 3A and 3B) are disposed to transmit and receive light that is incident on a first focal point 303 and substantially reflected to the second focal point 306.

The ellipsoid 300 is reflective of light. Its inner surfaces is coated with reflective coating of, for example, gold, protected gold, protected silver, protected aluminum, etc., to reflect light as shown. Notably, the ellipsoid 300 may be an elliptical reflector commercially available from Optiforms Inc., CA (USA). Specifically, light that is transmitted from the first focal point 303 or from proximity of the first focal point 303, for example from within centimeters of the first focal point 303 of the ellipsoid 300, is reflected by the inner surface of the ellipsoid 300, and as is known from principles of optics, is incident on a second focal point 306. Similarly, light that emerges from the second focal point 306 or from proximity of the second focal point 306 is reflected by the inner surface of the ellipsoid 300 and is incident on the first focal point 303 or in proximity to the first focal point 303. Stated somewhat differently, from basic principles of geometric optics, light that passes through (i.e., is transmitted from or is impingent on) or is in proximity to the first focal point 303 will be reflected by the inner surface of the ellipsoid and is incident (i.e., is transmitted from or is impingent on) onto the second focal point 306 or in proximity to the second focal point 306.

Referring first to FIG. 3A, light from a plurality of transmitters in the lidar DUT 304 provide optical signals 310. By transmitting from the multiple transmitters, optical signals 310 form layers of light and allow transmission over desired elevational angles or elevation. By way of illustration, lidar DUT 304 provides multiple layers of light from the first focal point 303 or its proximity over an elevational angular range of approximately ±25° relative to the horizontal plane that contains the first focal point 303. Multiple layers provide so called vertical view. Within the ellipsoid 300, all of the layers of light are reflected to the second focal point 306 or its proximity.

As described more fully below, optical signals 310 over this elevational range are incident on the second focal point 306 or its proximity and are transmitted to a simulator according to representative embodiments, and, on the return path from the simulator, are again incident on or in proximity to the second focal point 306, and reflected by the inner surface of the ellipsoid 300 to the first focal point 303 or its proximity and, consequently, reach respective receivers disposed on or in proximity to the first focal point 303. In this way, measurements over a desired elevational range can be carried out. Beneficially, the emitted optical signals 310 from respective transmitters are returned to respective detectors. When the transmitters and receivers of the lidar 302 operate in pairs, the proper distribution of the optical signals 310 is maintained.

Referring to FIG. 3B light from each of the transmitters covers the azimuth angle of up to 360°. This is typically accomplished by a rotating mechanism within the lidar. The collection of optical signals at different azimuth angles comprises the optical signals 310 of the lidar DUT 304. By transmitting from different rotational positions transmission over a desired azimuth angular range is realized. By way of illustration, lidar DUT 304 provides a plurality of optical signals from the first focal point 303 or from within its proximity that covers an angular range of approximately 360° (also referred to as horizontal view) relative to some reference position, e.g., relative to the direction of travel. As described more fully below, optical signals 310 over this angular range transmitted from the first focal point 303 or from within close proximity to the first focal point 303 after reflecting from the ellipsoid 300 are incident on or in proximity to the second focal point 306 and are transmitted to a simulator according to representative embodiments.

On the return path, after undergoing simulation, optical signals 310 are again incident on or in close proximity to the second focal point 306, and are reflected by the inner surface of the ellipsoid 300 to or near the first focal point 303 and, consequently, to the respective receivers disposed near the first focal point 303. In this way, simulated measurements over a desired angular range can be carried out. Beneficially, the emitted optical signals 310 from respective transmitters are returned to respective detectors. When the transmitters and receivers of the lidar 302 operate in pairs, the proper distribution of the optical signals 310 is maintained.

Figure 3C:
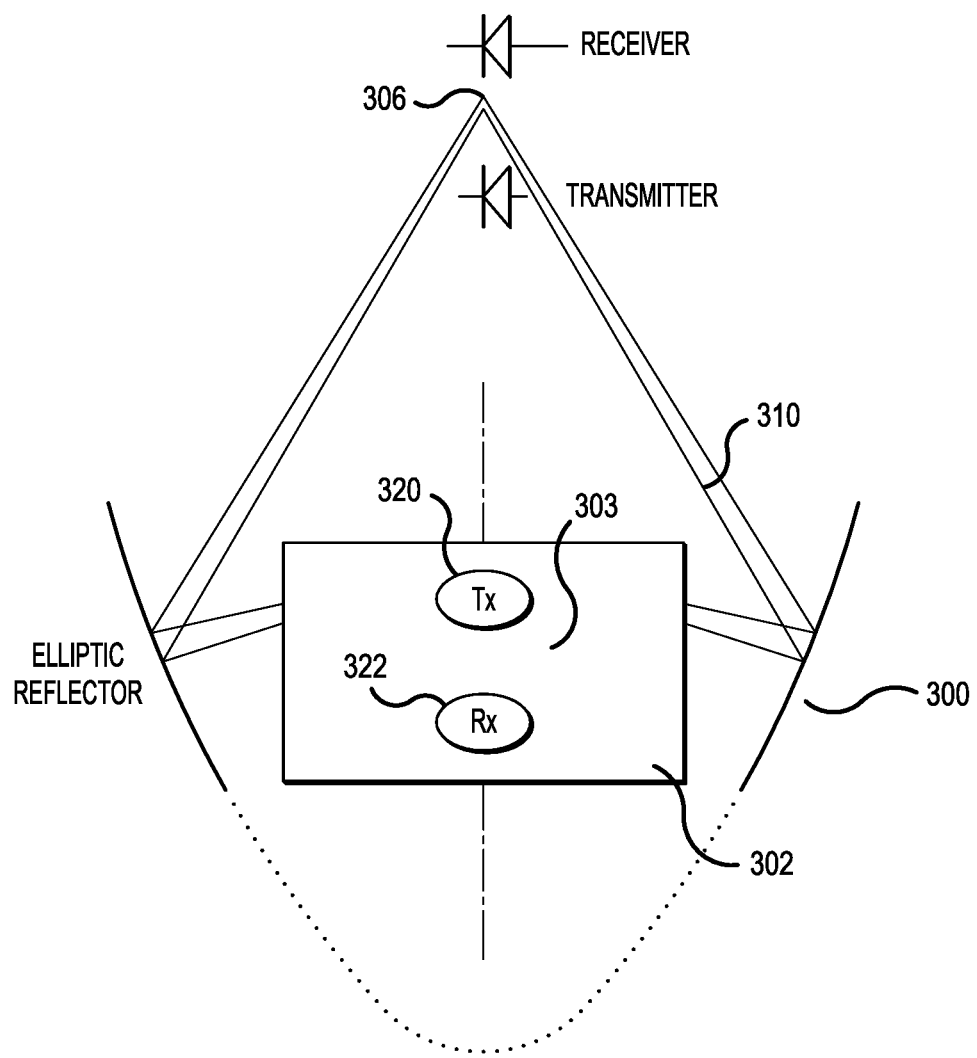
FIG. 3C shows the disposition of a lidar transmitter and lidar receiver at a focal point of an ellipsoid in accordance with a representative embodiment.

FIG. 3C shows the disposition of one paired lidar transmitter 320 and lidar receiver 322 of the lidar 302 in proximity to the first focal point 303 of an ellipsoid 300 in accordance with a representative embodiment. As described above, optical signals 310 from the lidar transmitter 320 located at, or in proximity to the first focal point 303, reflected by the inner surface of the ellipsoid 300, are incident on or in close proximity to the second focal point 306; and optical signals returned to or in close proximity to the second focal point 306 are incident on or in close proximity to the first focal point 303 and are received by the lidar receiver 322.

Figure 4A:
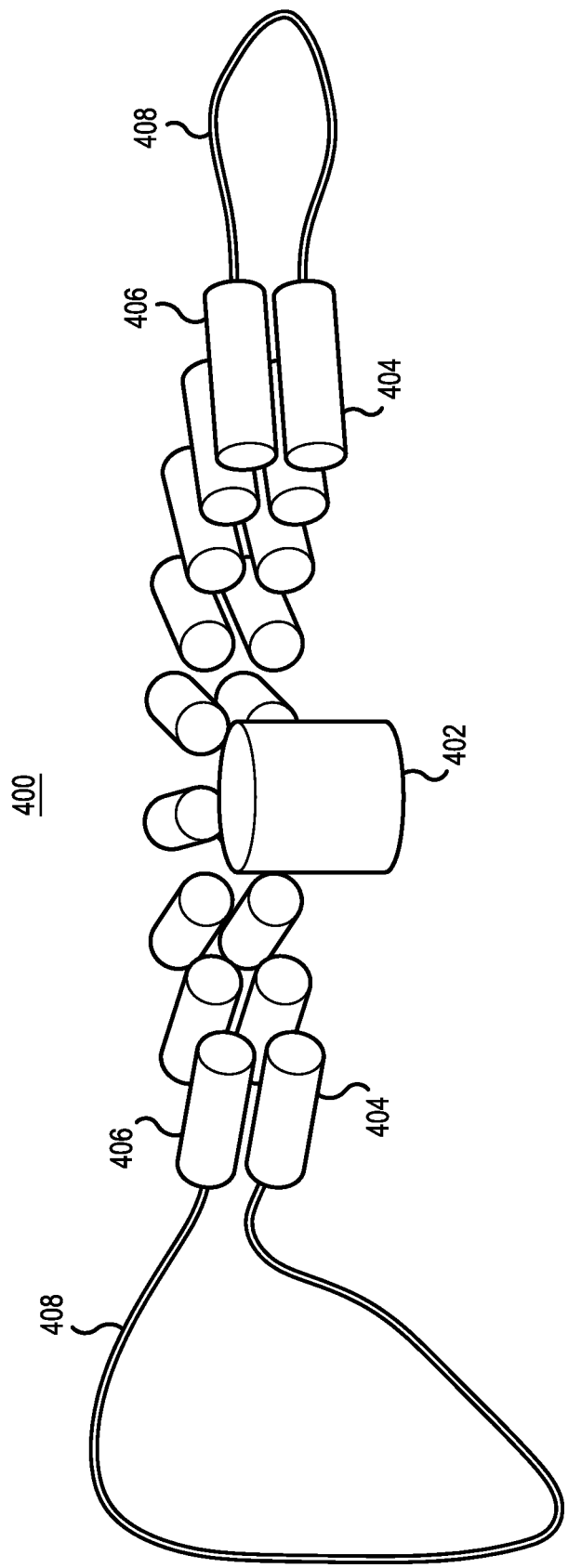
FIG. 4A is a perspective view of a lidar test system in accordance with a representative embodiment.

FIG. 4A is a perspective view of a lidar test system 400 in accordance with a representative embodiment. Various aspects of the lidar test system 400 are common to those described above in connection with FIGS. 1-3, and may not be repeated below.

The lidar test system 400 comprises a lidar DUT 402 that is adapted to provide laser test signals in an angular range of approximately 360°, and provides multiple layers of light over an elevational angular range of approximately ±25° relative to the plane normal to the lidar axis.

The lidar test system 400 further comprises a plurality of optical fibers, for example, a fiber array or an optical detector array surrounding the lidar DUT 402 as shown. Notably, the optical fiber array or the detector array is shown disposed only partially around the lidar DUT 402. The present teachings contemplate placing the optical fiber/detector array completely around (i.e., over 360° angle) the lidar DUT 402.

Referring to FIG. 4A, output signals from the lidar DUT 402 are transmitted to inputs 404 and are returned to the lidar DUT at outputs 406. Notably, in the event the signals from the lidar DUT 402 are provided to an optical fiber of the array, optics/lenses may be provided at the inputs 404 and the outputs 406 to facilitate efficient transmission of light from and to the lidar DUT 402 during testing. In the event when the signals from the lidar DUT 402 are converted to electrical signals, the inputs 404 comprise a photodetector and accompanying electronics (e.g., a gain element) to convert the optical signals from the lidar DUT 402 to electrical signals before providing the electrical signals to a delay element. Similarly, the outputs 406 may comprise an optical transmitter that converts the electrical signal back to an optical signal for reception at the respective detector of the lidar DUT 402.

A delay element 408 may be connected between each input 404 and each output 406. As described more fully below, the delay element 408 may be an optical delay element, which, in addition to providing optical delay to simulate distance, may be adapted to attenuate the signal from the lidar DUT 402 to simulate different degrees of reflectivity from different objects. The delay element 408 is a simplified representation of optical delay line 530, or optical delay line 550, or hybrid optical delay device 600, described below. Notably, delay elements 408 may simulate different degrees of delay/reflectivity that vary over time.

In operation, the light output from the lidar DUT 402 is provided to the optical fiber/photodetector array at input 404, passes through the delay element 408, which is contemplated to be adjustable such as by using optical switches or electrical switches, and routed back to the same angular position to output 406 to the same angular position relative to the lidar DUT 402, and are provided to the respective detector at the lidar DUT 402. Notably, the delay element 408 may comprise only optical delay elements and, in some embodiments, optical attenuators to simulate distance, and reflectivity, respectively. In other embodiments such as described below in connection with FIG. 6, the delay element 408 may be a hybrid device having both optical and electrical delay, and optical and electrical attenuators.

In embodiments in which the input 404 from the lidar DUT 402 is provided first to a photodetector, and is represented by an electrical signal, the electrical signal from the photodetector at the input 404 is provided to the delay element 408. In certain embodiments, the electrical delay element (e.g., transmission line delay elements, analog electrical circuit delay, digital programmable delay, etc.) is used to simulate distance. Similarly, the electrical delay element 408 may include an electrical attenuator to provide adjustable reflectivity measurements. After conversion of the optical signal from the lidar DUT 402 at the input 404 to an electrical signal, and after the electrical signal is processed, (i.e., delayed/attenuated electrically) the signal is provided back to optical transmitters in the output 406. The optical transmitters then provide recreated and processed signals to the respective detector of the lidar DUT 402. Illustratively, in order for the optical signal to be properly received, its wavelength needs to be similar to the original wavelength, however, the delay, shape, and amplitude may be altered. The delay and other optical characteristics of the emulated signals traversing the delay element 408 are then used to create a time-evolving scene.

FIG. 4B is a perspective view of a lidar test system 410 in accordance with a representative embodiment. Various aspects of the lidar test system 400 are common to those described above in connection with FIGS. 1-4A, and may not be repeated below.

The lidar test system 410 has the lidar DUT 402 disposed over a rotary stage 412 that rotates as shown by the arrow 414. Light from the lidar DUT 402 is provided to the delay element 408 connected between each input 404 and each output 406. As noted above, and as described more fully below, the delay element 408 may be an optical delay element, or an electrical delay element, or a hybrid of both, which, in addition to providing optical delay to simulate distance, may be adapted to attenuate the signal from the lidar DUT 402 to simulate different degrees of reflectivity from different objects.

In operation, the light beam from the lidar DUT 402 is spinning around the lidar axis to cover the azimuth angular range of up to 360°. The lidar DUT body is rotated clockwise or counterclockwise by the rotary stage 412 as indicated by the arrow 414 until a desired azimuth angle is aligned with the input 404 and output 406, for example, on the left side of the drawing. The rotary stage 412 is adapted to rotate to cover all angular positions of the 360° horizontal field of view.

Figure 5A:
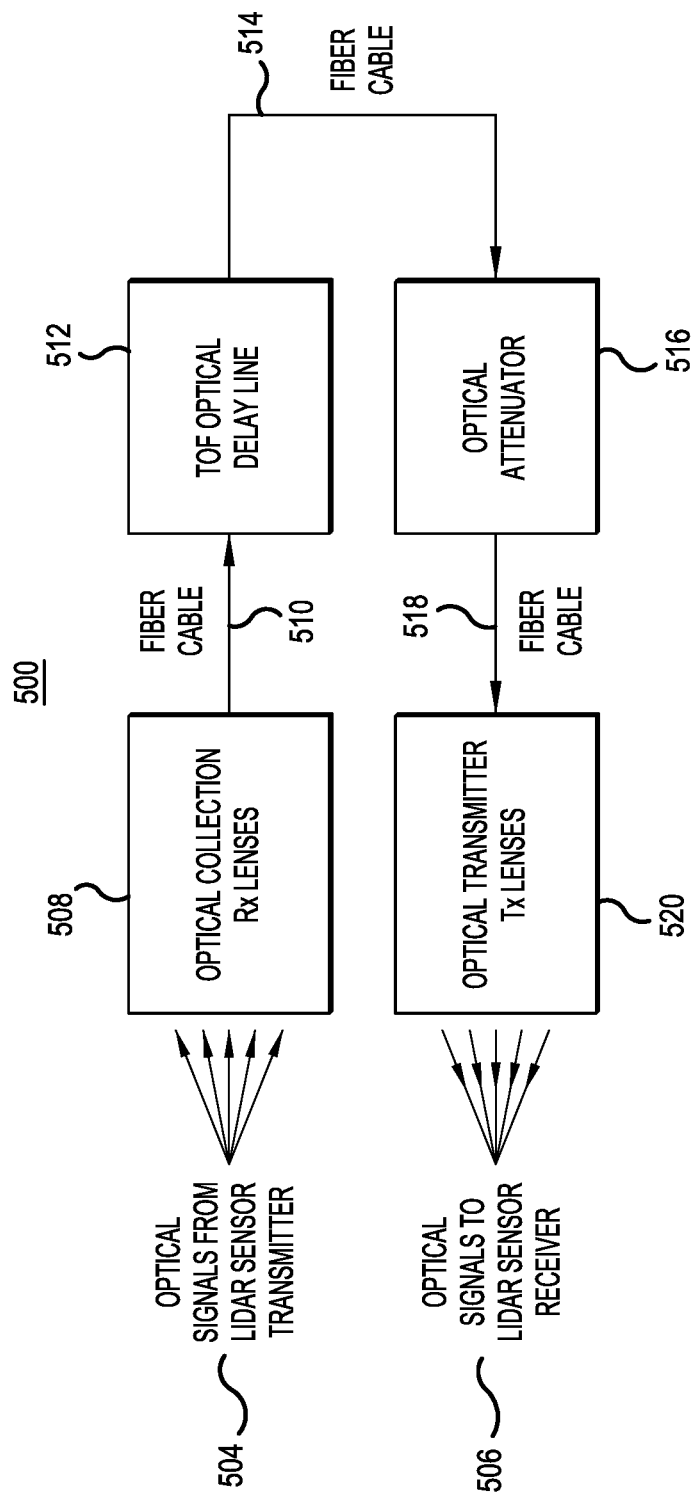
FIG. 5A is a simplified schematic block diagram of an optical lidar test system in accordance with a representative embodiment.

FIG. 5A is a simplified schematic block diagram of an optical lidar test system 500 in accordance with a representative embodiment. Various aspects of the lidar test system 400 are common to those described above in connection with FIGS. 1-4B, and may not be repeated below.

The optical lidar test system 500 provides an optical signal from the lidar under test (not shown in FIG. 5A) to an input 504. The optical signal is incident on optical collection lenses 508 and is provided to an optical fiber 510. The output from the optical fiber 510 is provided to a time-of-flight (TOF) optical delay line 512, which illustratively comprises series connected delay elements, parallel connected delay elements, or both. Illustrative examples of the delay elements used in the TOF optical delay line 512 are described in connection with representative embodiments in FIG. 5B and FIG. 5C.

The TOF optical delay line 512 is adapted to be dynamically variable, and as such is adapted to provide distance measurements of a simulated scene of varying magnitudes. As described more fully below, the use of optical switches is contemplated to change the delay (and thus simulated distance) over time. Moreover, the control of the optical switches may be provided by the controller 216 described above. Specifically, the processor 217 is adapted to execute instructions provided in the memory 218 that change the configuration of the TOF optical delay line 512 to emulate a desired distance.

The output of the TOF optical delay line 512 is provided to an optical fiber 514 for transmission to an optical attenuator 516. The optical attenuator 516 is configured to reduce the power (i.e., attenuate) of the optical signal received from the optical fiber 514 to emulate varying degrees of reflectivity of objects in the path of the lidar DUT. Just by way of illustration, the optical attenuation may be done using a known microelectromechanical system (MEMS) attenuator, such as a MEMs shutter-type attenuator. In accordance with a representative embodiment, such a MEMS optical attenuator is commercially available from Dicon Fiber Optics (CA-USA) (https://www.diconfiberoptics.com/products/mems_variable_optical_attenuators.php).

Alternatively, optical attenuator 516 may be a commercially available neutral-density filter. More generally, attenuation may be carried out through a change of alignment or distance between two fibers, or change of coupling between two fibers using adjustable mirror, etc.

Notably, the degree of attenuation may be controlled and varied dynamically like the TOF optical delay line 512 to dynamically vary the attenuation of the optical signal from the optical fiber 514. Control of the optical attenuator may be provided by the controller 216 described above. Specifically, the processor 217 is adapted to execute instructions provided in the memory 218 that change the configuration of the optical attenuator 516 to emulate a desired reflectivity.

Figure 5B:
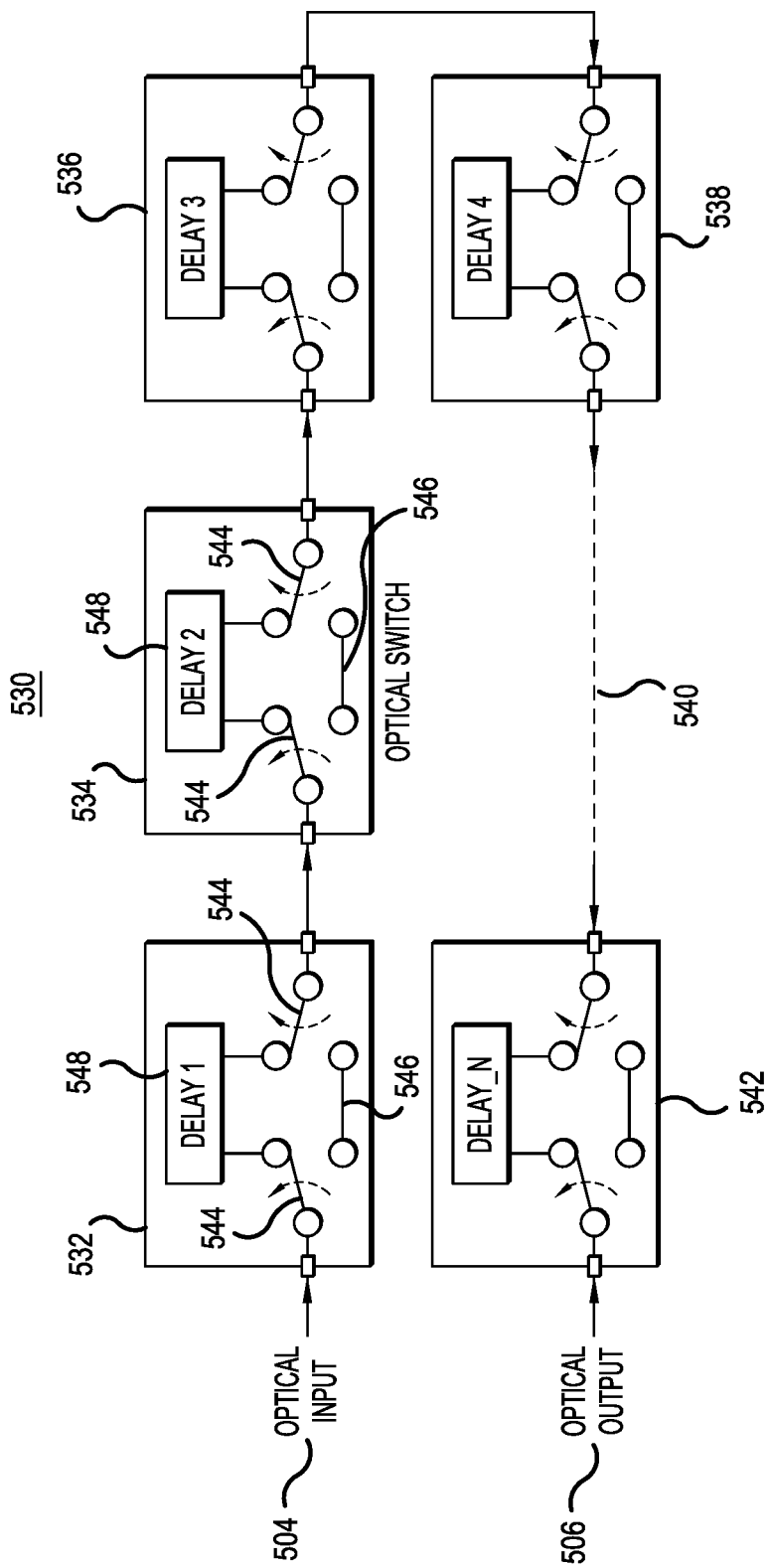
FIG. 5B is a simplified schematic diagram of an optical delay line having a plurality of optical delay elements connected in series in accordance with a representative embodiment.

FIG. 5B is a simplified schematic diagram of an optical delay line 530 having a plurality of optical delay devices 532, 534, 536, 538, 542 connected in series in accordance with a representative embodiment. Various aspects of the optical delay line 530 are common to those described above in connection with FIGS. 1-5A, and may not be repeated below.

Each delay element comprises optical switches 544 that are adapted to connect an optical fiber to a bypass line 546 or to an optical delay element 548 as shown. Specifically, when the optical switch engages the bypass line 546, little or no appreciable delay is added to the optical signal. By contrast, when the optical switches 544 are connected to the optical delay devices 532, an optical delay is provided. Notably, a similar structure is contemplated to provide optical attenuation by the optical delay devices 532, 534, 536, 538, 542. In such embodiments, the optical delay element 548 is replaced by an optical delay element 548, such as described above, to provide a desired degree of attenuation to simulate a desired reflectivity of an object. Notably, a variable optical attenuator, such as noted above, can be used for the optical attenuator.

In accordance with a representative embodiment, each successive optical delay device 532, 534, 536, 538, 542 provides an increasing delay (or attenuation) to simulate different distances or reflectivity. Specifically, when engaged by the optical switches 544 the optical delay element 548 of optical delay device 532 provides optical delay to the signal from the input 504. The output of the optical delay device 532 is provided to the optical delay device 534. When the optical switches 544 engage the optical delay element 548 of optical delay device 534, further delay is added to the optical signal from the input, with the delay provided by optical delay device 534 being greater than the optical delay provided by the optical delay device 532. Next, the optical delay provided by optical delay device 536 is greater than the optical delay device 534. The delay of optical delay device 538 is greater than that of optical delay device 536, and so on. Similarly, rather than providing ever-increasing optical delay, each successive optical delay device 532, 534, 536, 538, 540 can provide ever-increasing attenuation to emulate objects of different reflectivity. Often, this arrangement of optical switches and delays acts as a binary counter with the shortest delay line providing nanoseconds (e.g., 2 ns) of delay, and the longest delay line providing microseconds of delay (e.g., 2 μs). A typical distance that is simulated is approximately 0.5 m to approximately 300 m.

In operation the processor 217 executes instructions provided in memory 218 to configure the switches 244 to either be connected to the optical delay elements 548 or the bypass links 542. As such, the processor 217 executes instructions provided in memory 218 to selectively engage the optical delay devices 532, 534, 536, 538, 540 to provide a desired degree of delay to emulate a distance; or to provide a desired degree of attenuation to emulate reflectivity from an object. Alternatively, a variable optical attenuator can be used to emulate reflectivity of the object.

Figure 5C:
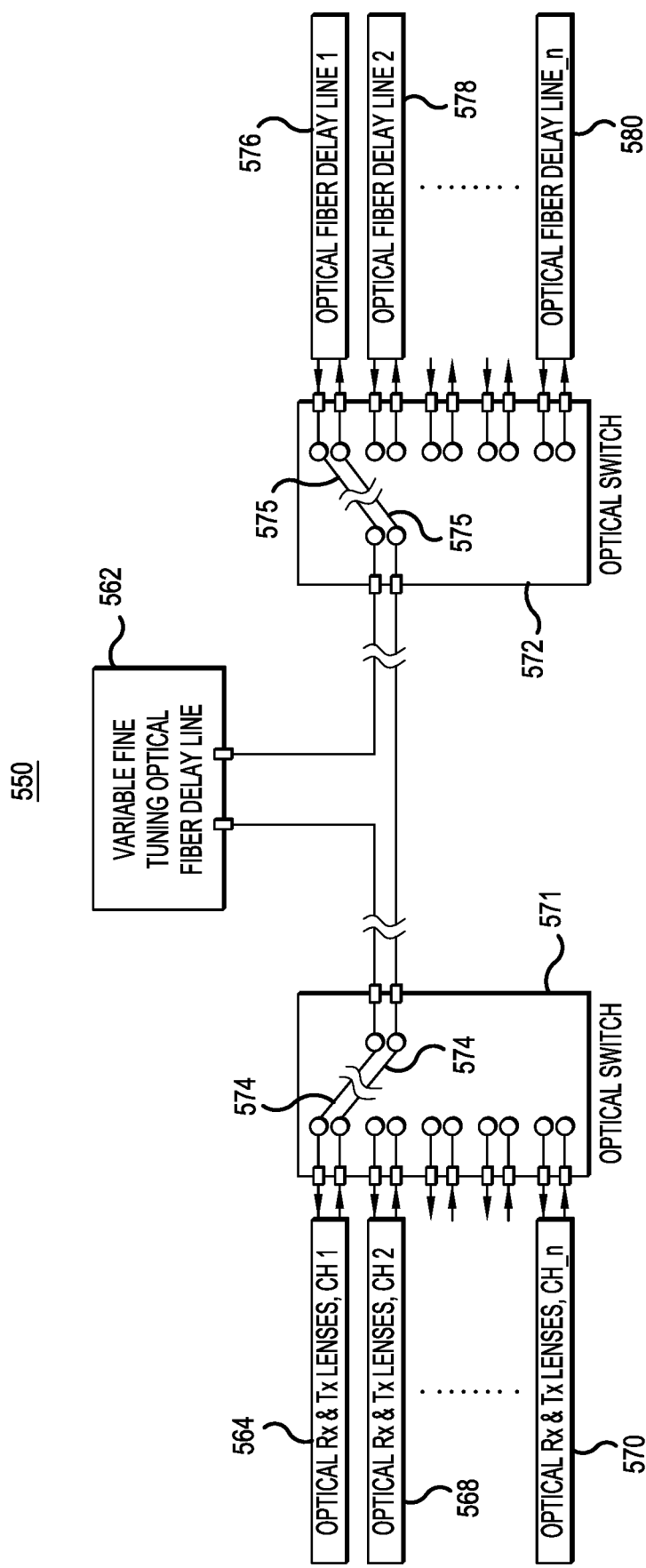
FIG. 5C is a simplified schematic diagram of an optical delay line having a plurality of optical delay elements connected in parallel in accordance with a representative embodiment.

FIG. 5C is a simplified schematic diagram of an optical delay line 560 having a plurality of optical delay elements connected in parallel in accordance with a representative embodiment. Various aspects of the optical delay line 550 are common to those described above in connection with FIGS. 1-5B, and may not be repeated below.

As shown a plurality of optical transmit and receive lenses 564, 568, 570 are provided, with each of the plurality of optical transmit and receive lenses 564, 568, 570 configured to receive channels (layers) 1, 2 . . . n from the lidar DUT (not shown in FIG. 5C).

A first optical switch 571 comprises a multi-position double optical switch 574 that is adapted to selectively engage input channels (layers) 1, 2 . . . n from the lidar DUT with a variable fine tuning optical fiber delay line 562, and optical delay elements 576, 578, 580 selected by the second optical switch 572 that operates in the same manner as the first optical switch 571. Notably, like optical delay elements 548 described above, the optical delay elements 576, 578, 580 provide different delays to emulate different distances. After traversing the selected optical delay element 576, 578, 580 of second optical switch 572, the delayed optical signals are returned to the lidar DUT by the engaged optical transmit and receive lenses 564, 568, 570. By selection of the proper optical switch 575, the amount of delay is set, and the signal returned to the desired optical transmit and receive lenses 564, 568, 570 by selection of the appropriate multi-position double optical switch 574. The shortest delay line provides nanoseconds of delay, and the longest delay line provides microseconds of delay. A typical distance that is simulated is 0.5 m to 300 m. By way of illustration, optical delay elements 576, 578, 580 each can create delay time of approximately 2 ns to approximately 2 µs. Variable fine tuning optical fiber delay line 562 can provide a variable delay between approximately 10 ps and approximately 2.5 ns. Optical delay line 550 with optical delay elements connected in parallel beneficially provide lower power losses compared to optical delay line 530 connected in series. But, optical delay line 530 provides the flexibility in configuring delay time dynamically instead of static delay time.

In operation the processor 217 executes instructions provided in memory 218 to configure the switches 574, 575 to selectively connect input channels (layers) 1, 2 . . . n to variable fine tuning optical fiber delay line 562, and optical delay elements 576, 578, 580. As such, the processor 217 executes instructions provided in memory 218 to selectively engage the fine variable tuning optical fiber delay line 562, and optical delay elements 576, 578, 580. In addition, a variable optical attenuator (not shown) can be used to provide a desired degree of attenuation to emulate reflectivity from an object.

Figure 6:
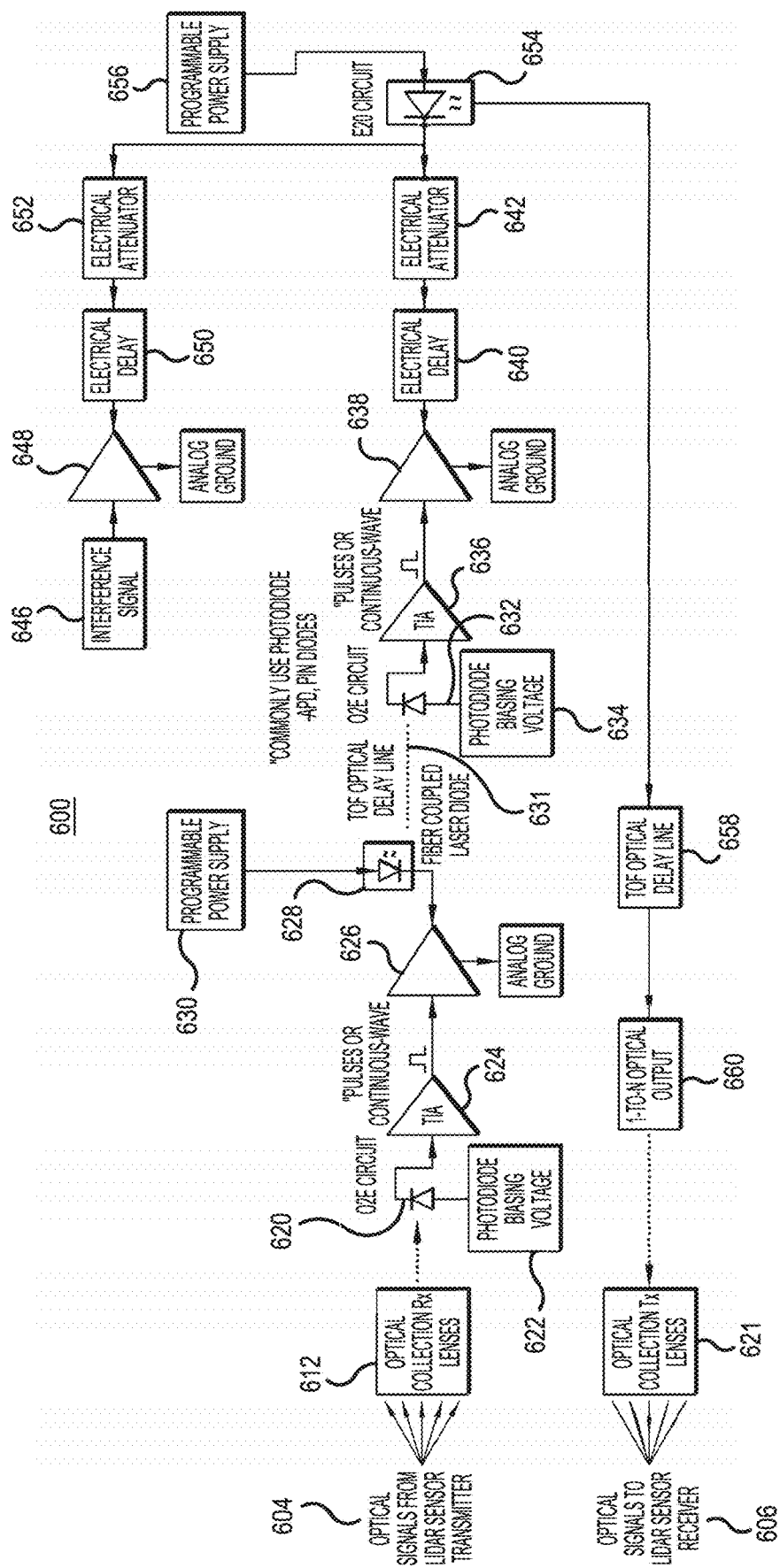
FIG. 6 is a simplified schematic diagram of a hybrid optical delay device comprising electrical and optical delay elements in accordance with a representative embodiment.

FIG. 6 is a simplified schematic diagram of a hybrid optical delay device 600 comprising electrical and optical delay elements in accordance with a representative embodiment. Various aspects of the hybrid optical delay device are common to those described above in connection with FIGS. 1-5C, and may not be repeated below. Notably, the hybrid optical delay device 600 is contemplated for use in testing lidar DUTs such as described in connection with various representative embodiments described above.

An input 604 receives optical signals from a lidar DUT (not shown in FIG. 6), and provides the optical signals to optical collection lenses 612. The optical signals are focused on a photodiode 620 (e.g., an avalanche photodiode or similar device), which is driven by a bias voltage from a first bias source 622. The output of the photodiode 620 is an electrical signal that is provided to a first transimpedance amplifier (TIA) 624 to provide an electrical signal of suitable magnitude to a first analog gain control (AGC)/diode driver circuit 626. Notably, the electrical signals from the TIA 624 may be continuous wave or pulse signals. The AGC/diode driver circuit drives a fiber coupled laser diode 628, which is connected to a programmable power supply 630. The programmable power supply 630 enables appropriate operating point of the fiber coupled laser diode 628. The programmable power supply 630 may be an adjustable voltage source to provide threshold level current with current limiting resistor, or an adjustable current source to provide threshold current of the fiber coupled laser diode 628.

Notably, the optical to electrical to optical conversion discussed to this point with respect to FIG. 6 is used to alter the wavelength of light for ease of adjustment of delay, attenuation, shape sensing, and interference. To this end, light from a lidar DUT is often provided as a signal having a wavelength of 905 nm. This wavelength is not common to optical communications systems, which operate, for example, at 1550 nm. As such, to curb unnecessary cost and to enable readily-available components and devices in the hybrid optical delay device 600, this first stage effects an optical conversion from an input wavelength of 905 nm to a wavelength of 1550 nm. As such, this stage of the hybrid optical delay device 600 can be foregone and the various components and devices used in the remainder of the hybrid optical delay device 600 can be selected to work with the particular wavelength of light from the lidar DUT.

The output from the fiber coupled laser diode 628 is provided to an optical fiber delay line 631 and then to a second photodetector 632 that is biased by a second bias source 634. Notably, the output of the fiber coupled laser diode 628 has a wavelength in the range of 1300 nm~1550 nm and the optical fiber delay line 631 is realized using a single mode fiber. The optical fiber delay line 631 may comprise the optical switches, optical delay devices and optical delay elements described above but operating at 1300 nm or 1550 nm, and thus often readily procured requiring little, if any, modification.

The output of the second photodetector 632 is an electrical signal that is provided to a second TIA 636 to provide an electrical signal of suitable magnitude to a second analog gain control (AGC)/diode driver circuit 638. Notably, the electrical signals from the second TIA 636 may be continuous wave or pulse signals.

The electrical signals from the second TIA 636 are then provided to a first electrical delay element 640. The first electrical delay element 640 may comprise known transmission line delay elements within the purview of one of ordinary skill in the art. Beneficially, the first electrical delay element 640 can provide a finer degree of delay to a signal than an optical fiber delay element, such as discussed above. By way of illustration, the first electrical delay element 640 can provide a delay in the range of a fraction of a nanosecond to tens of nanoseconds. For example, the first electrical delay element 640 may provide fine delay value of 10 ps, 20 ps, 40 ps, 80 ps, 100 ps, 200 ps, 400 ps . . . 1600 ps to complement optical fiber delay line 631.

In accordance with a representative embodiment, the first electrical delay element 640 provides a variable delay. By way of illustration, the first electrical delay element 640 may be controlled by controller 116 or controller 216. Specifically, processor 117 or processor 217 may execute instructions stored in memories 118, 218, respectively, to dynamically change the amount of delay provided by the first electrical delay element 640.

The electrical signals from the electrical delay element are then provided to a first electrical attenuator 642. The first electrical attenuator 642 may comprise known electrical attenuators (e.g., resistors) that are within the purview of one of ordinary skill in the art.

In accordance with a representative embodiment, the first electrical attenuator 642 provides a variable attenuation to the electrical signal. By way of illustration, the first electrical attenuator 642 may be controlled by controller 116 or controller 216. Specifically, processor 117 or processor 217 may execute instructions stored in memories 118, 218, respectively, to dynamically change the amount of attenuation provided by the electrical attenuator.

The hybrid optical delay device 600 optionally comprises an electrical interference signal source 646, which is adapted to emulate interference, for example, from a nearby lidar or other light source. The output from the electrical interference signal source 646, which may be a source of electrical noise, is amplified by a third AGC/diode driver 648 as needed. Notably, the electrical interference signal source 646 can be a voltage source such as a known arbitrary waveform generator that could generate noise signal, modulated sinewave or pulse train as an interference. The output of the third AGC/diode driver 648 is provided to a second electrical delay element 650 and a second electrical attenuator 652. The second electrical delay element 650 and the second electrical attenuator 652 provide distance and reflectivity simulations for the interfering signal from the electrical interference signal source 646. Like the first electrical delay element 640 and first electrical attenuator 642, the second electrical delay element 650 and the second electrical attenuator 652 are also variable, and may be controlled by controllers 116, 216 as described above.

The output signals from the first and second electrical attenuators 642, 652 are provided to an output laser diode 654, which is biased by a power supply 656. The output from the output laser diode 654 are provided to an optional output optical delay line 658 and an optional 1×n splitter 660 before being transmitted to the optical collection lenses 621 to provide an output 606 for reception by the lidar DUT (not shown in FIG. 6) at the original wavelength (typically at 905 nm).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for testing a light detection and ranging (LIDAR) device under test (DUT), the system comprising:
an ellipsoid having a first focal point and a second focal point, the ellipsoid being adapted to receive the LIDAR DUT at the first focal point, wherein light transmitted from the LIDAR DUT is incident on the second focal point; and
an optical waveguide or an optical element coupled to the second focal point, and adapted to transmit light from the second focal point to a link comprising a delay device that provides a delay to emulate a desired distance.

2. The system of claim 1, wherein after traversing the delay device, the light is transmitted by the optical waveguide back to the second focal point and is reflected by the ellipsoid to the first focal point.

3. The system of claim 2, further comprising an attenuation device adapted to reduce a power of the light prior to the light's being transmitted back to the second focal point, wherein the reduced power emulates a reflectivity of an optical signal reflected from an object.

4. The system of claim 2, wherein the ellipsoid reflects light from the first focal point over an angular range of approximately 360° to the second focal point.

5. The system of claim 2, wherein the light from the optical waveguide incident on the second focal point is reflected over an angular range of approximately 360° to the first focal point.

6. The system of claim 2, wherein the ellipsoid light from the first focal point extends over an elevational angular range of approximately ±25° to the second focal point.

7. The system of claim 1, wherein an inner surface of the ellipsoid comprises an optically reflective inner surface comprising a layer of one of silver, gold, or aluminum.

8. An apparatus for testing a light detection and ranging (LIDAR) device, comprising:
an ellipsoid comprising a substantially hollow interior having a first focal point and a second focal point, the ellipsoid being adapted to receive a LIDAR DUT at the first focal point, wherein light transmitted from the LIDAR DUT is incident on the second focal point.

9. The apparatus of claim 8, wherein the light incident on the second focal point is transmitted to a link comprising a delay device that provides a delay to emulate a desired distance.

10. The apparatus of claim 8, wherein a surface of the substantially hollow interior of the ellipsoid is optically reflected.

11. A system for testing a light detection and ranging (LIDAR) device under test (DUT), the system comprising:
an ellipsoid having a first focal point and a second focal point, the ellipsoid being adapted to receive the LIDAR DUT at the first focal point, wherein light transmitted from the LIDAR DUT is incident on the second focal point;
an optical input disposed adjacent to and in optical communication with the second focal point and adapted to receive an input signal;
a delay device coupled to the optical input and comprising an electrical delay element, wherein the delay device is adapted to emulate a desired distance; and
an optical output disposed adjacent to and in optical communication with the second focal point, the optical output adapted to receive an output signal from the delay device, and transmit the output signal to the second focal point.

12. The system of claim 11, wherein the input signal is converted to an electrical signal by the delay device, and the electrical signal is converted to an optical signal before being received by the optical output.

13. The system of claim 11, wherein the optical input and the optical output are optically coupled to an optical waveguide disposed adjacent to and in optical communication with the second focal point.

14. The system of claim 13, wherein the waveguide is coupled to a port of an optic coupler.

15. The system of claim 11, wherein the optical input is one of a plurality of optical inputs disposed adjacent to and in optical communication with the second focal point.

16. The system of claim 11, wherein the optical output is one of a plurality of optical outputs disposed adjacent to and in optical communication with the second focal point.

17. The system of claim 16, wherein the plurality of optical inputs and the plurality of optical outputs are coupled to an optical waveguide.

18. The system of claim 11, wherein the optical signal is an optical pulse, and the electrical delay element is adapted to alter an amplitude of the optical pulse to emulate a reflectivity from an object.

19. The system of claim 11, wherein the optical signal is an optical pulse, and the electrical delay element is adapted to alter a shape of the optical pulse to emulate a shape of an object.

* * * * *